US008851499B1

(12) United States Patent
Thompson

(10) Patent No.: US 8,851,499 B1
(45) Date of Patent: Oct. 7, 2014

(54) ELECTRONICALLY RETRACTABLE MOTORCYCLE WHEEL STABILIZER DEVICE

(71) Applicant: Charles Cleon Thompson, San Jose, CA (US)

(72) Inventor: Charles Cleon Thompson, San Jose, CA (US)

( * ) Notice: Subject to any disclaimer, the term of this patent is extended or adjusted under 35 U.S.C. 154(b) by 0 days.

(21) Appl. No.: 14/159,354

(22) Filed: Jan. 20, 2014

Related U.S. Application Data

(60) Provisional application No. 61/836,753, filed on Jun. 19, 2013.

(51) Int. Cl.
*B62H 1/02* (2006.01)
*B62H 1/12* (2006.01)
*B62D 61/12* (2006.01)

(52) U.S. Cl.
CPC . *B62H 1/12* (2013.01); *B62D 61/12* (2013.01)
USPC .......................................... 280/298; 280/304

(58) Field of Classification Search
CPC ............. B62H 1/00; B62H 1/10; B62H 1/12; B62H 1/14; B62H 3/00; B62H 7/00
USPC .................. 280/293, 296, 298, 301, 304, 755
See application file for complete search history.

(56) References Cited

U.S. PATENT DOCUMENTS

| | | | |
|---|---|---|---|
| 1,177,290 A | 3/1916 | Tollstam | |
| 1,185,381 A | 5/1916 | Dawson | |
| 3,602,528 A | 8/1971 | Kelly | |
| 4,133,402 A | 1/1979 | Soo Hoo | |
| 4,203,500 A | 5/1980 | Kamiya | |
| 4,638,880 A * | 1/1987 | Togashi | 180/219 |
| 4,826,194 A | 5/1989 | Sakita | |
| 5,029,894 A | 7/1991 | Willman | |
| 6,213,237 B1 | 4/2001 | Willman | |
| 6,296,266 B1 | 10/2001 | Martin | |
| 6,845,999 B2 * | 1/2005 | Royal et al. | 280/304 |
| 7,032,916 B2 * | 4/2006 | Plana | 280/293 |
| 7,287,774 B2 | 10/2007 | Mullins | |
| 7,992,584 B1 * | 8/2011 | Birnbaum | 280/304 |
| 2005/0212254 A1 * | 9/2005 | Heitner | 280/298 |

OTHER PUBLICATIONS

"Motorcycle park reverse wheel", http://www.youtube.com/watch?v=dsSvdPIZXeo , uploaded Oct. 22, 2009.
"Motorcycle Park Reverse Wheel", http://mcprw.com/, posted Aug. 30, 2011.

* cited by examiner

*Primary Examiner* — Tony Winner
(74) *Attorney, Agent, or Firm* — Stephen E. Zweig

(57) ABSTRACT

Aftermarket motorcycle stabilizer that attaches to motorcycle crash bars without making irreversible structural modifications to the motorcycle frame. The device is optimized to supplement motorcycle stability during intermittent periods of stopping or very slow speed operation. The stabilizer operates by way of a fixture (often a two part fixture) designed with various complementary indentations designed to allow the two parts of the stabilizer fixture to clamp onto different types of motorcycle crash bars. A pivoting arm is also attached to the fixture, along with an electronic actuator attached to both the arm and the fixture. The actuator raises or lowers the arm upon receiving appropriate manual or automatic signals. The opposite end of the arm has at least one small wheel. Thus extending the arm brings the wheel into contact with the ground, while retracting the arm will bring the arm generally flush with the motorcycle body.

19 Claims, 9 Drawing Sheets

ELECTRONICALLY RETRACTABLE
MOTORCYCLE WHEEL STABILIZER
DEVICE

CROSS REFERENCE TO RELATED
APPLICATIONS

This invention claims the priority benefit of U.S. provisional patent application 61/836,753, "Motor Cycle Outrigger Wheels", inventor Charles Cleon Thompson, filed Jun. 19, 2013; the complete contents of which are incorporated herein by reference.

BACKGROUND OF THE INVENTION

1. Field of the Invention

This invention is in the field of stabilizing devices for two-wheel motorcycles.

2. Description of the Related Art

Two wheeled motorcycles, although generally quite stable at higher speeds, tend to become less stable at slow speeds, and relatively unstable when they are stopped. As a result, riders of two-wheel motorcycles are typically accustomed to extending their legs to help stabilize a motorcycle during frequent decelerations and stops (e.g. at traffic signals).

Although use of the rider's legs to stabilize slow speed and stopped two-wheeled motorcycles is quite feasible when the weight of the motorcycle is relatively low, and the rider(s) relatively strong with full use of both legs, this practice becomes more problematic as the weight of the motorcycle increases, as well as for less strong riders, or riders with limitations in the use of one or more legs.

Various methods of stabilizing two-wheeled motorcycles have been proposed. These include Tollstam U.S. Pat. No. 1,177,290; Dawson U.S. Pat. No. 1,185,381; Kelly U.S. Pat. No. 3,602,528; Soo Hoo U.S. Pat. No. 4,133,402; Kamiya U.S. Pat. No. 4,203,500; Sakita U.S. Pat. No. 4,826,194; Wllman U.S. Pat. No. 5,029,894; Willman U.S. Pat. No. 6,213,237; Martin U.S. Pat. No. 6,296,266; Millins U.S. Pat. No. 7,287,774 and others.

On Oct. 22, 2009, a video describing a "motorcycle park reverse wheel" was uploaded onto YouTube at: http://www.youtube.com/watch?v=dsSvdPIZXeo and this device was also described in more detail on Aug. 30, 2011 on applicant's website at mcprw.com. These disclosures described an earlier version of applicant's actuator type stabilizer wheel described herein. This earlier version was configured to fit onto only one specific location of one specific motorcycle type design, and differed in other respects as well with respect to the present disclosure.

Despite this previous art, there remains an unmet need for further advances in this field.

BRIEF SUMMARY OF THE INVENTION

The present disclosure is based, in part, on the insight that prior art motorcycle stabilizing devices were often poorly suited for the purpose of providing stabilizing assistance during times that a motorcycle might be temporarily stopped at a traffic signal, or other temporary halt during use. This is because prior art devices were generally bulky and conspicuous, and often include extraneous components (oversize stabilizer wheels, shock absorbers, etc.). This was due, in part, to the fact that prior art devices were primarily focused on the problem of stabilizing motorcycles traveling at higher speeds (e.g. greater than 25 miles per hour). Another problem with prior art stabilizing devices is that they tended to be highly customized for each individual motorcycle design.

Another problem with prior art stabilizing devices is that they were generally not designed to be after-market installed (that is installed after sale of the factory assembled motorcycle). As a result, the prior art stabilizing devices often required substantial structural modifications to the factory assembled motorcycle. Motorcycles can be quite expensive, and are often prized for their appearance. Thus any requirement for major structural modifications will be a strong negative in this type of situation.

The present disclosure, is also based, in part, on the insight that there is an unmet need for an improved small, lightweight, and inconspicuous motorcycle stabilizer wheel that could ideally be extended by the user (ideally using an electric motor) during the brief periods of time when a motorcycle might be temporarily stopped (such as at a traffic light or stop signal), and then easily retracted by the user when normal speed motorcycle operations is desired. Put alternatively, the present disclosure is based in part on the insight that there was an unmet need for motorcycle stabilizers for motorcycles operating in the 0-5 mile per hour speed range.

The present disclosure is also based, in part, on the insight that ideally such a lightweight and inconspicuous motorcycle stabilizer wheel design should be highly flexible—that is able to accommodate a variety of different motorcycle designs, preferably even from different manufacturers.

Modern motorcycles (e.g. standard two-wheel motorcycles equipped with two main motorcycle wheels, an engine, battery, and the like) are often factory equipped (e.g. Original Equipment Manufacturer (OEM) equipped) with one or more protruding side mounted crash bars. These protruding crash bars are intended to protect the motorcycle and the rider in the event that the motorcycle falls over or crashes. As might be imagined, this can be particularly devastating at high speeds, and crash bars can help mitigate damage in these situations.

Motorcycle crash bars are generally formed from rugged metal tubes, which are securely attached to the main frame of the motorcycle. These crash bars are designed to cope with the high amount of forces that the motorcycle may encounter during a crash situation. In such crash situations, it is hopefully the protruding crash bar, rather than the motorcycle body (or the rider's body) that encounters the road pavement first. The crash bar is thus designed to skid along the pavement, and at least partially absorb the crash forces, and thus help reduce damage to the rider and the rest of the motorcycle.

The invention is based, in part, on the insight that these motorcycle crash bars represent excellent attachment points by which to mount one or more aftermarket motorcycle stabilizer wheel devices.

Thus in one embodiment, the invention may be an aftermarket motorcycle stabilizer wheel device. The stabilizer device, which will often be used for temporary slow speed or stopping conditions during normal motorcycle operation, when the motorcycle's stability is suboptimal due to slow speeds, may be configured to be installed on one or more of the crash bars of a non-stabilizer wheel equipped, two wheel OEM motorcycle, without requiring any irreversible structural modifications to the motorcycle's frame.

In some embodiments, the invention may further comprise an electrically operated linear actuator with an actuator motor side and an extendible actuator piston side. This actuator, in conjunction with a switch (often mounted on the handle bars) and optional motion sensors enables the motorcycle rider to either manually or automatically use the actuator's extendible actuator piston to extend and retract a stabilizer arm. The proximal end of the stabilizer arm will be attached, via a pivot joint, to the main part of the stabilizer device, while the distal portion of the stabilizer arm will hold the stabilizer wheel.

Thus when the rider wishes extra stability, such as when the rider is stopped at a stop light, in manual operation mode the rider may press a switch and have the electrically driven actuator extend the stabilizer arm until the stabilizer wheel contacts the ground. When the rider wishes to start moving forward again, the rider can press a switch and have the electrically driven stabilizer retract the stabilizer arm. This will allow motorcycle to resume normal operation. Alternatively the system may automatically extend the stabilizer at very low speeds.

DETAILED DESCRIPTION OF THE INVENTION

The invention's motorcycle wheel stabilizer device may be designed to be mounted on a wide variety of different motorcycle crash bars and motorcycle design types from various OEM motorcycle manufacturers. However in this disclosure, the Honda Goldwing 1800 motorcycle, a heavyweight two-seater touring motorcycle with a 1832 cubic centimeter six cylinder engine, a curb weight of about 900 pounds, with front and side mounted crash bars on either side of the motorcycle, will be used as a particular example.

In some embodiments, the invention may be a motorcycle stabilizer wheel device configured to be installed in a non-stabilizer wheel equipped, two wheel OEM motorcycle, without requiring irreversible motorcycle frame structural modifications.

Figure 1:
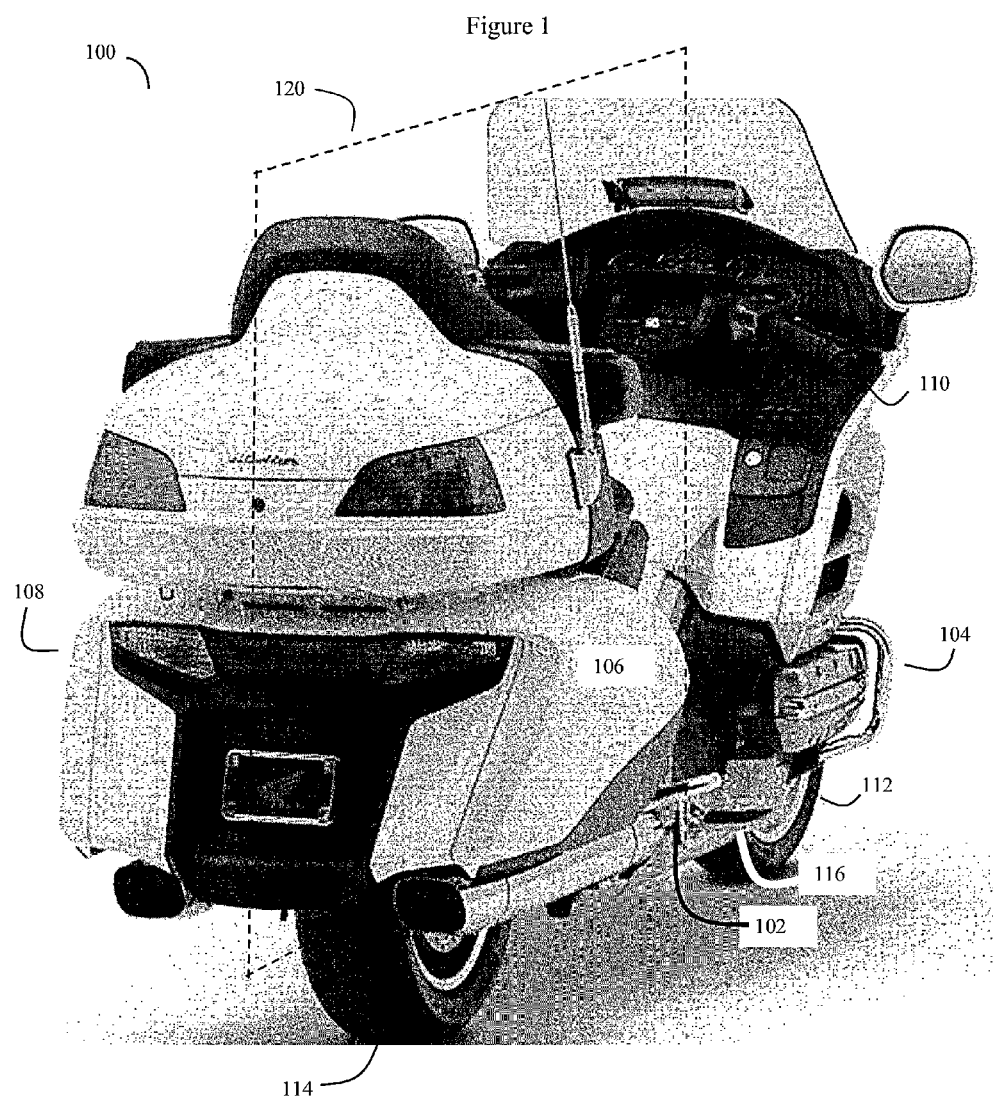
FIG. 1 shows an example of a touring type motorcycle (here a Honda Goldwing 1800), showing location of two of the crash bars in this particular model.

FIG. 1 shows an example of a touring type motorcycle (100) (here a Honda Goldwing 1800), showing the location of two of the right side crash bars (102), (104), the saddlebags (106, 108), handlebars (110), two main motorcycle wheels (112, 114), and the passenger foot rest (116) in this particular model. The battery cannot be seen from this view.

Figure 2:
FIG. 2 shows an example of how the stabilizer device may be mounted on various crash bar locations and types.

FIG. 2 shows an example of how the stabilizer device (200a, 200b) may be mounted on various crash bar locations and types. This example shows that the stabilizer device may be mounted on either the front (104) or side (102) crash bar. Although often one stabilizer may be mounted on each side of the motorcycle, in some embodiments, such as when stabilization on only one side is required, only one stabilizer may be mounted. Although it is generally not typical to mount more than one stabilizer for each side of the motorcycle, if extra stabilization is required, this may also be done.

Thus in a preferred embodiment, generally two motorcycle wheel stabilizer devices, each disposed on opposite sides of the motorcycle, will be used to stabilize the motorcycle.

Figure 3:
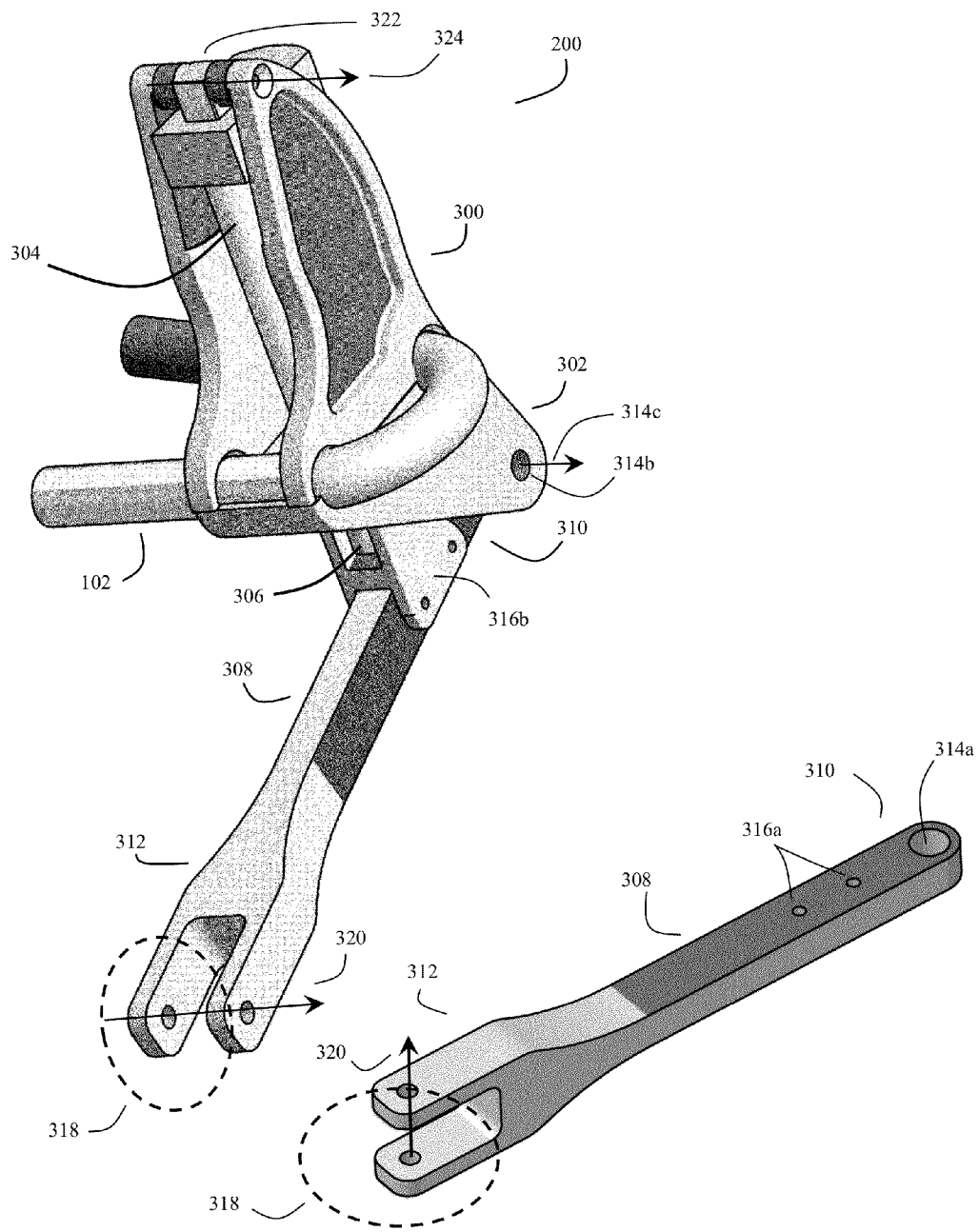
FIG. 3 shows a close up of the stabilizer device, here shown mounted on a portion of a crash bar.
Figure 4:
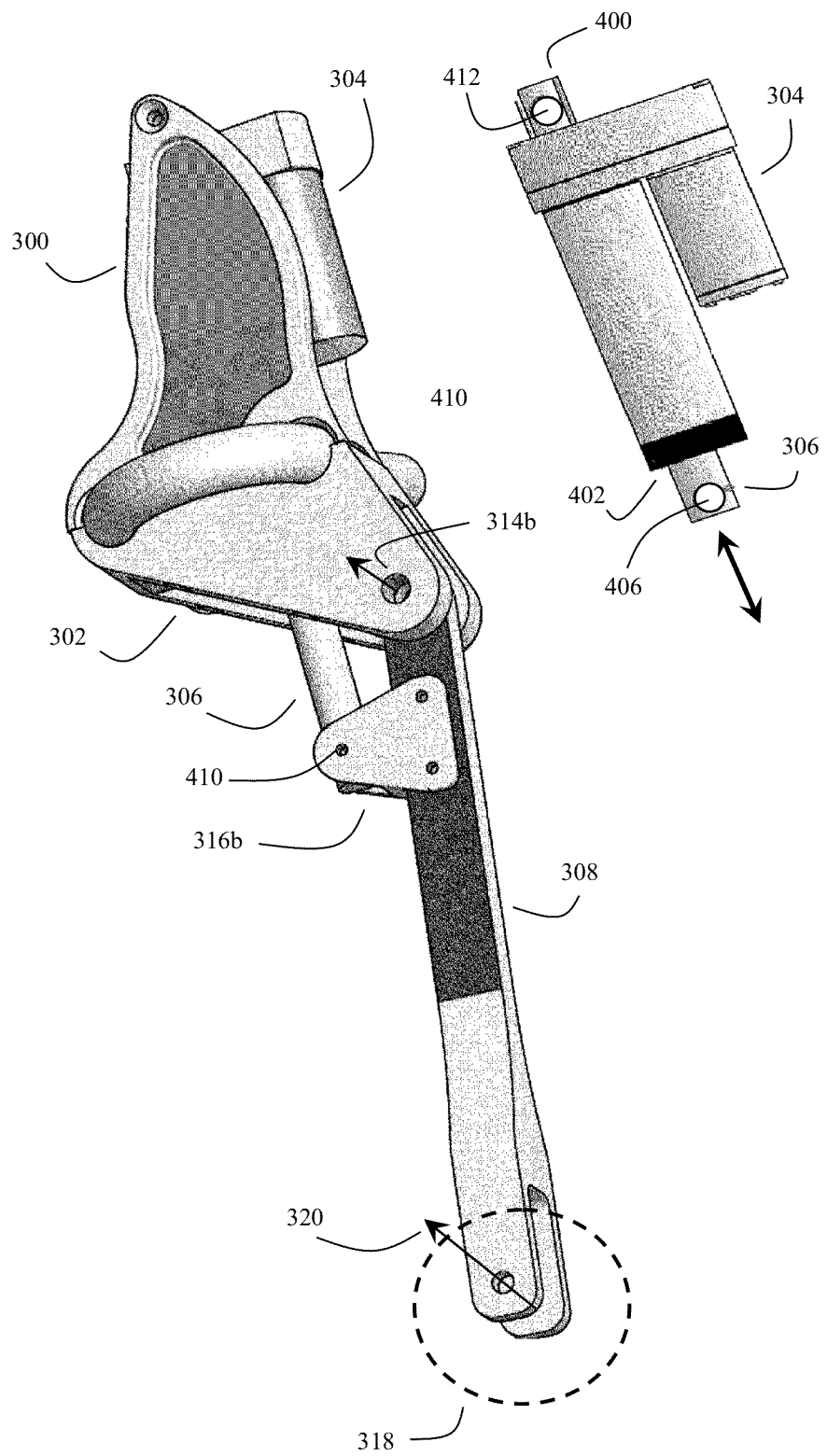
FIG. 4 shows a second view of the stabilizer device, again mounted on a portion of a crash bar.

FIG. 3 shows a close up of the stabilizer device (200), here shown mounted on a portion of a crash bar (102). The stabilizer device often has an upper fixture portion (300) and a lower fixture portion (302) that are bolted together across the crash bar (102). In this embodiment, the device also has an electrically operated linear actuator (304) with a motor side (400) and an extendible actuator piston side (402), which is also shown more clearly in FIG. 4. This electrically operated linear actuator (304) is configured to extend and retract an extendible actuator piston (306) upon receiving power from a power source, such as the motorcycle's battery.

Thus stabilizer device is affixed to the crash bar (102) using the stabilizer mounting fixture (300, 302) which may have multiple sections or portions such as the previously discussed upper fixture portion (300) and a bottom fixture portion (302). This fixture is configured to be mounted onto at least one side mounted crash bar (e.g. 102, 104) without requiring irreversible structural modifications to either the crash bar or the motorcycle's body.

The stabilizer device will also comprise a stabilizer arm (308) with a proximal end (310) and a distal end (312). This arm (308) will be configured with a stabilizer mounting fixture pivot component (314a) and an extendible actuator piston pivot (316a, 316b) component, usually disposed near the proximal end of this arm (310). The arm will also usually comprise at least one stabilizer wheel (318) and axle (320) disposed near the distal end of the arm.

Various types of electrically operated linear actuator (304) may be used in the device. One example, shown in FIG. 4 in more detail, is the Firgelli Automations FA-240-S-12-3 actuator, produced by the Canadian firm Firgelli Automations, of Surrey British Columbia. This actuator uses 12 volts DC current, and draws 5 amps. It is a high force linear actuator, with a load of 200 pounds, and a stroke length of 3 inches. Internally it uses an Acme screw with a 30:1 gear ratio. In one embodiment, this electrically operated linear actuator (304) attaches to the upper stabilizer mounting fixture portion (300) at the actuator's motor side (400). This attachment can be a clevis type joint (322) where clevis pin (324) goes through hole (412).

Put alternatively, the upper stabilizer mounting fixture 300 can, for example incorporate a upper stabilizer mounting fixture clevis bracket 322, with clevis pin 324 going through hole (412). Other types of mounting apparatus can also be used.

The actuator's extendable piston (306) can in turn attach to the stabilizer arm (308). In some embodiments, this can be done by another clevis bracket arrangement 316a and 316b with clevis pin (410) going thorough hole (406). Other types of mounting apparatus can also be used.

Put alternatively, in some embodiments, the extendable piston (306) may comprise an actuator piston pivot component comprising hole (406), clevis bracket (316b), and clevis pin (410). This pivot component or joint (316b, 406) allows the piston (306) to pivotally attach to the stabilizer arm (308) by way of the extendible actuator piston (306) pivot component(s) (316b, 316a, 406, 410).

Thus when the rider wishes to stabilize the motorcycle, the rider (for example) can use a switch (500) to apply electrical current at a first electrical polarity to the actuator (304). This causes the extendible piston (402) to become fully extended, and this in turn forces the stabilizer arm (308) to extend outwards from the motorcycle body. Usually the arm (308) will be extended until the stabilizer wheel (318) touches the ground, in order to stabilize the motorcycle body in an upright position.

Conversely when the rider wishes to retract the stabilizer wheels (318), the rider can use a switch (500) to apply electrical current of the opposite electrical polarity to the actuator (304). This causes the actuator piston (306) to retract, which also in turn causes the stabilizer arm (308) to retract. Usually the stabilizer arm will be retracted a sufficient distance, back towards the motorcycle body, to allow the motorcycle to operate normally on two standard motorcycle wheels without any interference from the arm (308).

The stabilizer wheel (318) (or the secondary stabilizer wheel which will be discussed shortly), may often be fabricated from some more resilient rubber or plastic like material. The actuator (304) will generally comprise a variety of different components. To reduce weight, most of the other motorcycle wheel stabilizer components may be fabricated from a lightweight metal such as aluminum. However when weight considerations are not an issue, and/or where stronger materials are needed, use of alternate metals such as stainless steel may also be used. Additionally, in some embodiments, high strength plastics or composites may also be used.

Figure 5:
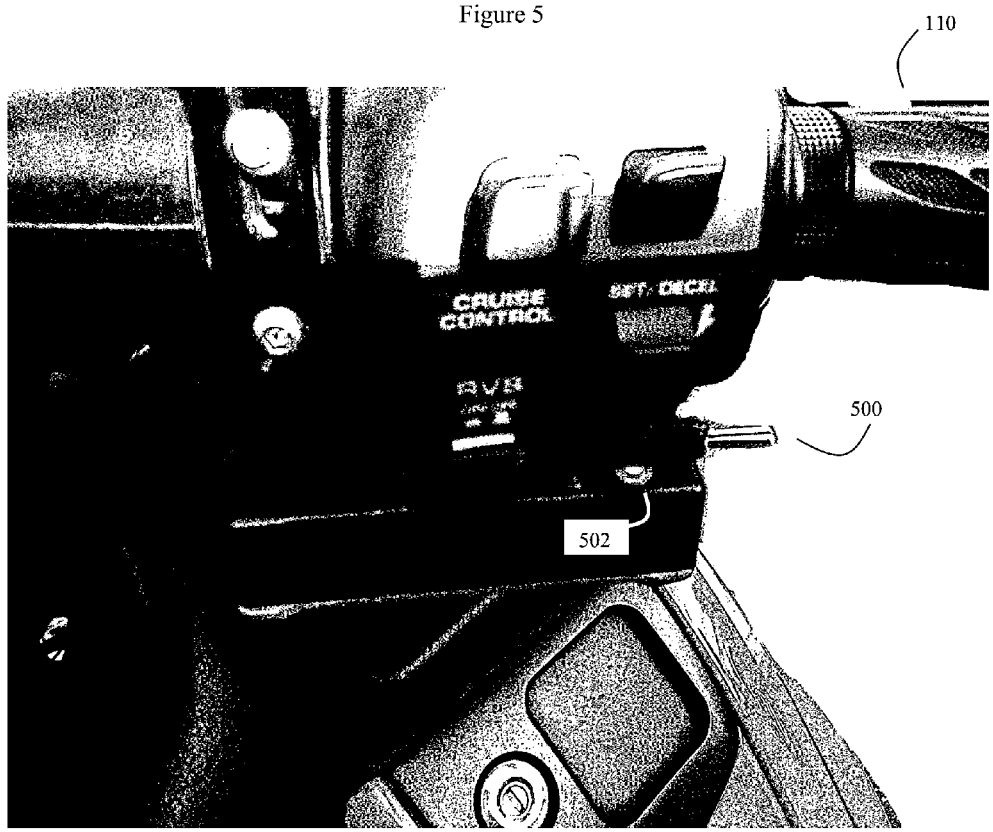
FIG. 5 shows how in one embodiment, the actuator switch may be mounted at a convenient location on the motorcycle's handlebars.

Although the switch (500) to operate the actuator may be placed in any rider accessible location on the motorcycle, or even be radio controlled, in a preferred embodiment, the electrical switch (500) (and associated wiring) will be attached to a convenient location on the motorcycle handlebars (110), such as near the right or left handed handlebar grip. This is shown in FIG. 5.

Ideally the switch (500) will be reversibly attached to the handlebars (110) by way of various mounting brackets and screws. Once in place, this electrical switch and associated wiring will then be configured to draw electrical current from the motorcycle's battery. Depending on the position of the switch, the switch in turn will send either positive electrical current, negative electrical current, or no electrical current to the electrically operated linear actuator.

In some embodiments, this electrical switch will also have one or more indicator lights (502). The indicator light or lights can be configured to emit light differently depending upon if the switch is set to cause the actuator (304) to lower the stabilizer wheel (318), raise the stabilizer wheel (318), or neither. The changing switch positions (500) in turn will generally send positive electrical current, negative electrical current, or no electrical current to the actuator (304).

In other embodiments, the electrically operated linear actuator (304) may be further configured to receive electrical operating commands more from sophisticated microprocessor controlled sensors and devices. These sensors and processor(s) may either be provided by a smartphone or other computer operated device, or alternatively built into the motorcycle mounted switch (500) directly.

Thus for example if an accelerometer, other motion sensor, or engine status sensor (e.g. engine RPM) (either mounted on switch 500 or provided by wire or radio (e.g. Bluetooth™) connected smartphone or other device) detects that the motorcycle has slowed to a stop or near stop, the processor may direct the stabilizer wheels (318) to automatically lower. When the accelerometer, motion sensor, or engine status sensor detects that the motorcycle has resumed motion, the processor(s) may direct the stabilizer wheels (318) to rise again. The user then may use the switch (500) to instead set or override this automatic operation.

In a preferred embodiment, the motorcycle wheel stabilizer device (200) will have the stabilizer mounting fixture component(s) (300, 302) configured to mount on more than one alternative motorcycle crash bar model, manufacturer, or crash bar location.

In the following discussion, note that motorcycle crash bars are typically formed from robust metal tubes with an approximate diameter of around 1 inch. Thus each crash bar tube can be viewed as having two hemispheres, such as a lower crash bar (tube) portion, and an upper crash bar (tube) portion.

As previously discussed, in a preferred embodiment, the stabilizer mounting fixture (300, 302) can be formed from a lower mounting fixture portion (302) bolted to an upper mounting fixture portion (300). Both the lower (302) and upper (300) mounting fixture portions in turn can be configured with various indentations (e.g. 600, 602) designed to accommodate various types and orientations of crash bars (e.g. 102, 104, etc.). In a preferred embodiment, the stabilizer mounting fixture will accommodate more than one type of crash bar, so that the same fixture can be used either in multiple crash bar locations and/or multiple motorcycle designs.

Thus the lower mounting fixture (302) can have a plurality of indentations (600, 602) configured to accommodate the lower portions of a variety of different crash bars, and similarly the upper mounting fixture (300) can also have a plurality of indentations (not shown) configured to accommodate the upper portions of a variety of different crash bars as well. This flexibility can be further enhanced by use of various mounting fixture adjustment screws, inserts, and the like. As a result, the same mounting fixture set (i.e. the lower mounting fixture (302), upper mounting fixture (300), and any bolts needed to couple the two parts together) may be used for a variety of different motorcycle models.

In some motorcycle designs, such as the previously discussed Honda Goldwing 1800, the motorcycle is configured to have at least one (typically two) saddlebags (106, 108), a seat that can hold both a driver and a passenger sitting behind the driver, footrests for both the driver and the passenger (116). This model typically has two crash bars (102, 104) mounted on each side of the motorcycle (i.e. 4 crash bars in all). One of these crash bars, (102) is situated in a gap or space between the passenger footrest (116) and the saddlebag (106). Thus as a specific example, the upper (300) and lower (302) mounting fixture portions of the stabilizer mounting fixture, and their respective indentations (e.g. 600, 602), may be configured to mount on this particular type of crash bar (102) that is situated between the saddlebag (106) and the passenger footrest (116). The overall dimensions of the stabilizer mounting fixture (e.g. 300, 302) may also be further configured to fit into the space between the saddlebag and the passenger footrest.

Figure 6:
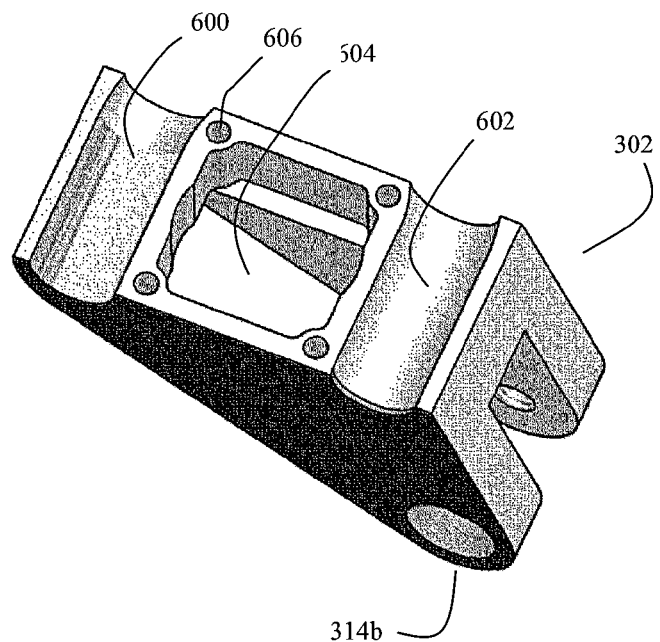
FIG. 6 shows a detail of the bottom portion of the lower fixture portion of the stabilizer mounting fixture, showing two indentations configured to accommodate the lower portion of the stabilizer bar.
Figure 6:
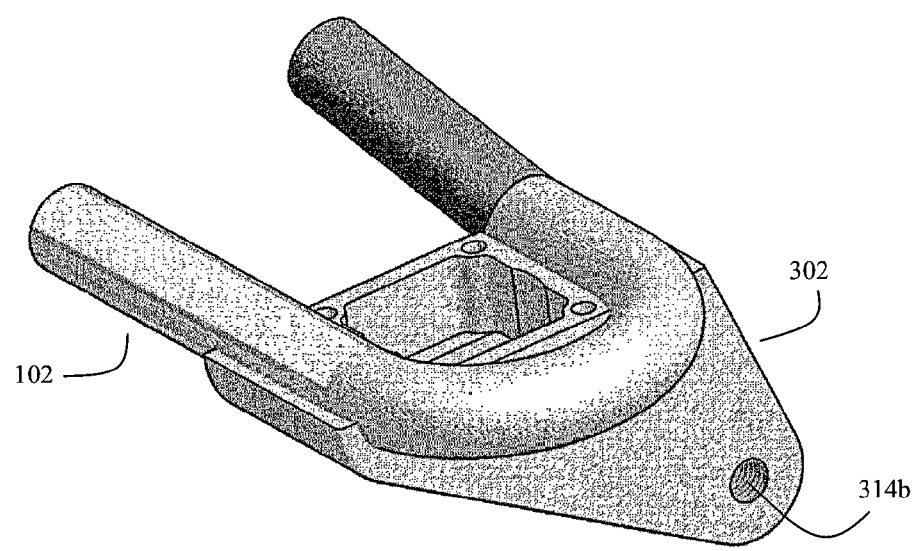

FIG. 6 shows a detail of the bottom portion of the lower fixture portion of the stabilizer mounting fixture (302), showing two indentations (600, 602) configured to accommodate the lower portion of various types of crash bars such as (102). The upper portion of the stabilizer mounting fixture (300 not shown) also has complementary indentations configured to accommodate the upper portion of various types of crash bars. In other embodiments, either less or more than two indentations (600, 602) may be used on the lower (302) and upper (300) portions of the stabilizer mounting fixture, depending upon how many different types of crash bar the manufacturer wishes to accommodate at the same time with the same fixture.

Note that although FIG. 6 and some of the other figures may occasionally show an embodiment where the thread holes are on the outside of the mounting supports, and the bevel holes are on the inside of the mounting supports. In a preferred embodiment, however, the reverse may be done where the thread holes may be on the inside of the mounting supports, and the bevel holes may be on the outside of the mounting supports.

Note that in this particular design, the interior of the lower and upper portion of the stabilizer mounting fixture (300, 302) is hollow (604) in order to provide space for the actuator piston. The position of the bolt holes used to bolt the lower portion of the stabilizer mounting fixture to the upper portion of the stabilizer mounting fixture is also shown as (606). The bolts or screws are not shown.

Thus in some embodiments, the lower (302) and upper (300) portions of the stabilizer mounting fixture are both configured with a plurality of bolt holes (606). These bolt holes (606) will often be disposed outside the various crash bar indentations (600, 602), or at least outside of the indentations used for a particular crash bar configuration. This is done so that when the lower (302) and upper (300) portion of the mounting fixture are bolted together, the stabilizer mounting fixture grips the crash bar (102) or bars tightly. This helps constrain the mounting fixture from moving or pivoting about the crash bar. In some cases, the geometry of the motorcycle body frame or the particular crash bar used may also help prevent the mounting fixture from moving.

Not all motorcycle crash bars (102, 104) will be mounted the same height above the ground. Some crash bars may be mounted lower to the ground, while others may be mounted higher above the ground. To accommodate these differences, in some cases (not shown) instead of being a fixed length, the stabilizer arm (308) may additionally be configured to extend to a plurality of different arm lengths. This allows the arm (308), when used with multi-crash bar compatible stabilizer mounting fixtures designed to work with a plurality of different crash bar heights above the ground, to continue to function adequately even when mounted on different crash bars with different heights above the ground.

Motorcycle bodies are typically formed from various curved components. This is for both aesthetic reasons, and also for functional reasons (less wind resistance, lower probability of generating damage in the event of a collision). To help match the both the appearance and functionality of the other motorcycle body components, in some embodiments, the sides of the stabilizer mounting fixture (300, 302) may be curved with various radiuses of curvature generally in keeping with the radius of curvature of other motorcycle body components.

Figure 7:
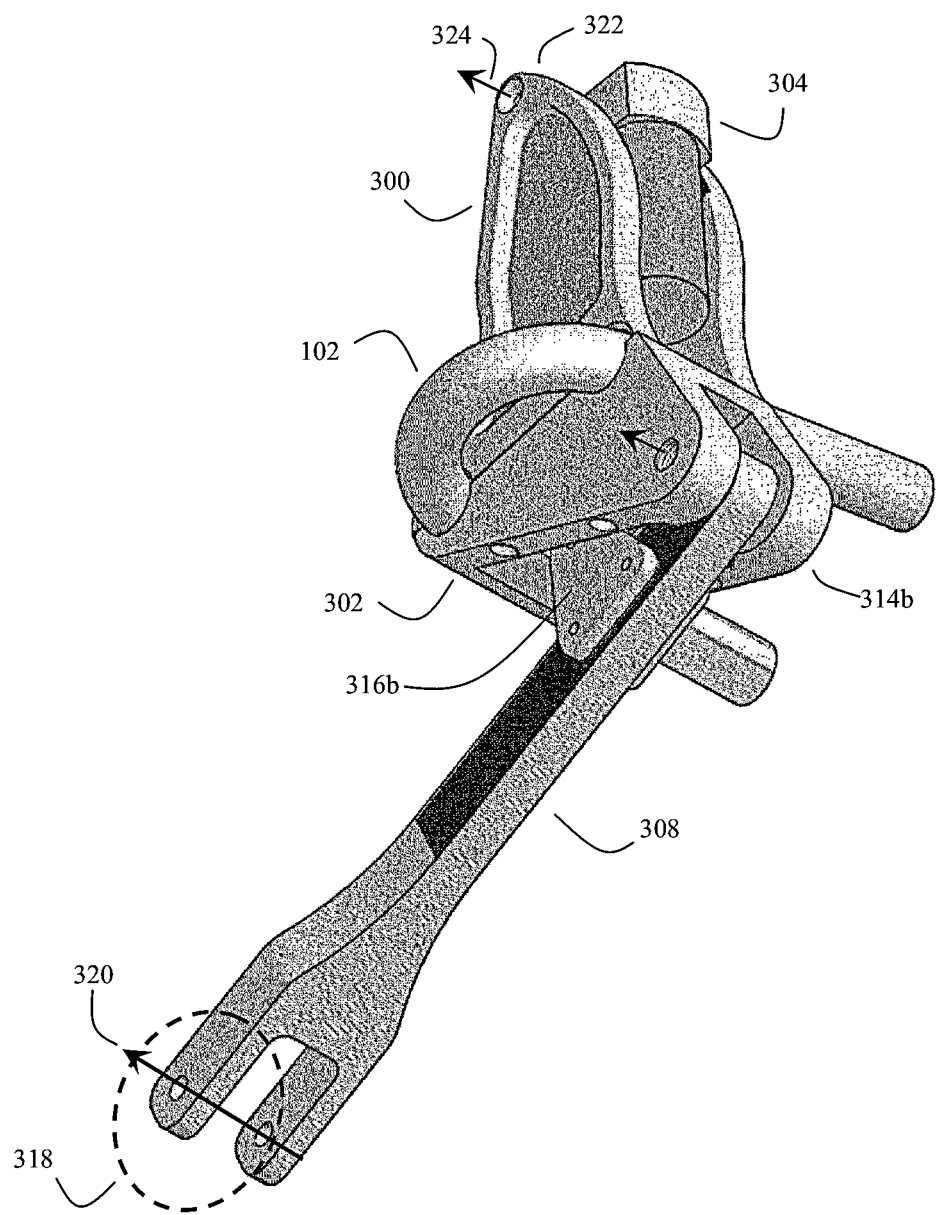
FIG. 7 shows a third view of the invention's stabilizer device.

FIG. 7 shows a third view of the invention's stabilizer device. As previously discussed, in some embodiments, the lower fixture portion (302) of the stabilizer mounting fixture can be also configured to form a stabilizer arm (308) holding clevis portion of a clevis fastener (314b).

This figure also shows another view of a clevis bracket or joint (316b) that attaches the actuator piston (306) to the extendable arm (308). That is, the piston (306) of the electrically operated linear actuator (304) can be mounted on the stabilizer arm (308) using a piston clevis fastener (316b).

Also as previously described, in some embodiments, the distal end (312) of the stabilizer arm (308) can be configured as a wheel clevis portion of a clevis fastener. The stabilizer wheel (318) (or primary stabilizer wheel) can be attached to this wheel clevis portion using a wheel clevis pin or axle (320). Other stabilizer wheel mounting devices and schemes may also be used as well.

Motorcycle bodies generally have at least substantial bilateral symmetry. That is, although certain details, such as exhaust pipe arrangements, may be non-symmetrical, generally the motor cycle wheels, handlebars, seat, and most other elements of the motorcycle have a plane of substantial symmetry. This plane of substantial symmetry is also shown in FIG. 1 (120).

Figure 8:
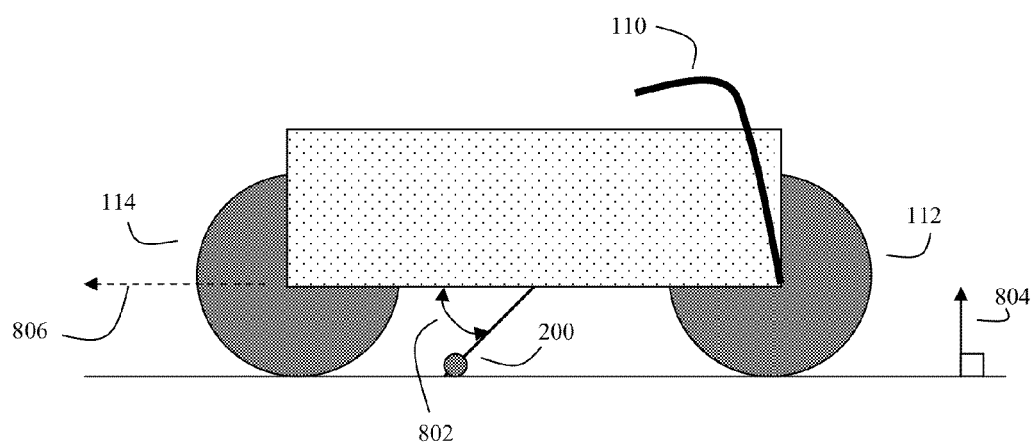
FIG. 8 shows some of the support arm angles, relative to the motorcycle's body.
Figure 8:
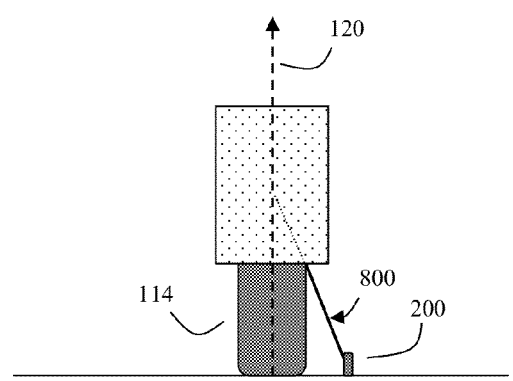

Relative to this plane of substantial symmetry (120), in some embodiments, the stabilizer device may be configured so that the stabilizer arm, when fully extended, extends at an angle "alpha" (800) directed more than 10 degrees away from this plane of substantial symmetry. This is shown in FIG. 8.

In some embodiments, the stabilizer device may be configured so that the stabilizer arm, when fully extended, has an angle "beta" (802) that is not less than 10 degrees of perpendicular to the ground. Here the perpendicular to the ground is shown as (804). Thus if for example, (802) was an angle perpendicular to the ground, it would be within 0 degrees of perpendicular to the ground (804). Generally angle (802), relative to a line parallel to the ground, such as (806) will be between about 45 degrees and about 80 degrees, where 80 degrees is 10 degrees of perpendicular to the ground (804).

Although when the motorcycle is fully stationary, a stabilizer wheel (318) is not needed at all, to accommodate very slow speeds, such as 0-5 mile per hour speeds often encountered while slowing down in preparation for a stop, or resuming forward motion after a stop, a small stabilizer wheel (318) with a circumference between about 2-8 inches is useful to accommodate any residual motorcycle movement. Such small circumference wheels, however, rapidly become unsuitable as motorcycle speed increases.

In some situations, such as motorcycle parades, extremely low speed limit zones, and the like, where more continuous operation in the 1-5 mile per hour speed range is contemplated, it may be useful to further configure the stabilizer with a larger auxiliary or secondary stabilizer wheel, with a larger circumference in the 6-12 inch range (900). This is shown in FIG. 9.

Figure 9:
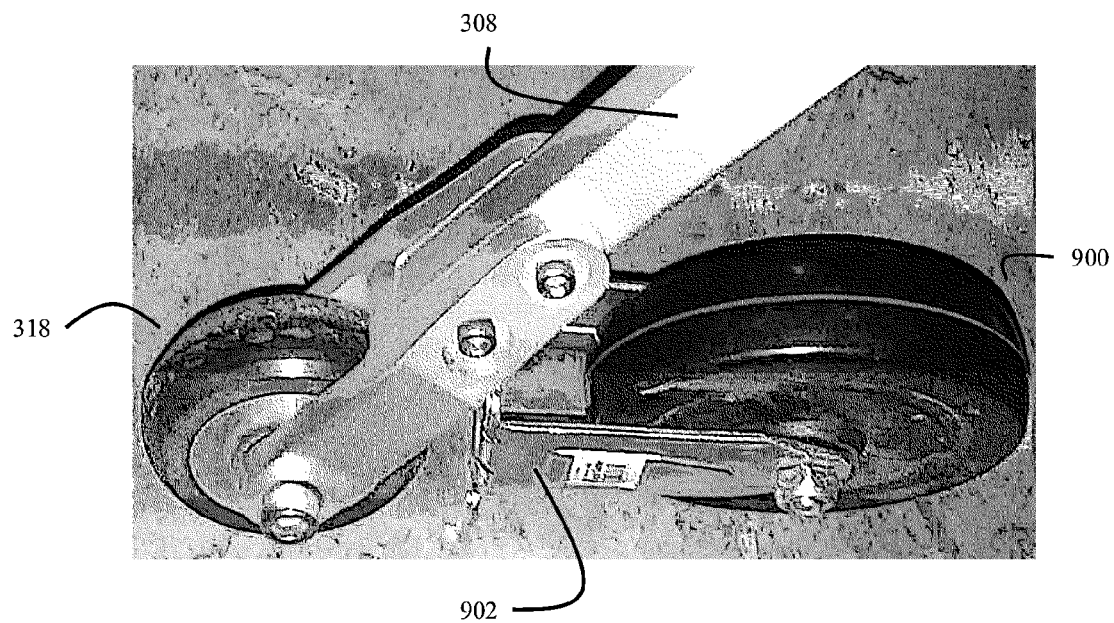
FIG. 9 shows an example of how a secondary stabilizer wheel may also be affixed to the distal portion of the stabilizer arm to supplement the function of the primary stabilizer wheel.

FIG. 9 shows an example of how a secondary stabilizer wheel (900) may also be affixed to the distal portion (312) of the stabilizer arm (308) to supplement the function of the primary stabilizer wheel (318).

In this embodiment, the stabilizer arm (308) may further comprise both the previously discussed (original or primary) stabilizer wheel (318) acting as the primary stabilizer wheel, as well as an additional secondary stabilizer wheel (900). This secondary stabilizer wheel may be disposed on a pivoting stabilizer wheel support (902), which can also be positioned near the distil end the stabilizer arm as well.

This pivoting secondary stabilizer wheel support (902) can either be user attachable/detachable, or alternatively have a plurality of user adjustable positions, thus allowing the secondary stabilizer wheel (900) to be configured by the user to act, relative to the primary stabilizer wheel (318), either to bear some or all of the stabilizer load (thus facilitating slow speed motorcycle movement), or alternatively none of the stabilizer load (when the user wishes the weight to fall only on the primary stabilizer wheel.).

In some embodiments, the secondary stabilizer wheel support (902) can be capable of pivoting around arm (308), and may further comprise various springs, elastic elements, or pneumatic elements. These can absorb at least some of the shock that may occur when the secondary stabilizer wheel is bearing at least some of the stabilizer load, and the motorcycle is moving at slow speeds over somewhat irregular pavement or ground.

The invention claimed is:

1. A motorcycle stabilizer wheel device configured to be installed in a non-stabilizer wheel equipped, two wheel OEM motorcycle comprising a two wheel motorcycle body, handlebars, at least one side mounted crash bar, and a motorcycle battery, without requiring irreversible structural modifications to said OEM motorcycle, said device comprising:
- an electrically operated linear actuator with a motor side and an extendible actuator piston side, said electrically operated linear actuator configured to extend and retract an extendible actuator piston upon receiving power from said motorcycle battery;
- a stabilizer mounting fixture configured to be mounted onto said at least one side mounted crash bar without requiring irreversible structural modifications to either said crash bar or said motorcycle body, wherein the sides of said stabilizer mounting fixture are curved
- a stabilizer arm with a proximal end and a distal end, said arm configured with a stabilizer mounting fixture pivot component and an extendible actuator piston pivot component disposed near said proximal end of said arm, and a stabilizer wheel disposed near said distal end of said arm;
- wherein said electrically operated linear actuator is further configured to attach to said stabilizer mounting fixture at said motor side, and further configured to pivotally attach to said stabilizer arm at said extendible actuator piston pivot component;
- wherein, when said extendable actuator piston is fully extended due to application of electrical current to said electrically operated linear actuator, said stabilizer arm extends outwards from said motorcycle body for a sufficient distance to stabilize said motorcycle body in an upright position;
- and wherein, when said extendable actuator piston is fully retracted due to application of an opposite polarity electrical current to said electrically operated linear actuator, said stabilizer arm retracts towards said motorcycle body a sufficient distance for said motorcycle to operate normally on two standard motorcycle wheels without interference from said stabilizer arm.

2. The motorcycle stabilizer wheel device of claim 1, wherein said motorcycle stabilizer wheel device further comprises an electrical switch and associated wiring reversibly attached to said handlebars, said electrical switch and associated wiring configured to draw electrical current from said motorcycle battery, and send either positive electrical current, negative electrical current, or no electrical current to said electrically operated linear actuator.

3. The motorcycle stabilizer wheel device of claim 2, wherein said electrical switch further comprises a processor, and at least one sensor, and wherein said electrical switch is further configured to either manually operate said actuator, or automatically operate said actuator upon response to signals from said at least one sensor.

4. The motorcycle stabilizer wheel device of claim 1, wherein said motorcycle further comprises at least one saddlebag, a dual seat disposed to accommodate both a driver and a passenger, at least one passenger footrest, and at least one crash bar disposed between said saddlebag and said passenger footrest;
- wherein for each said saddlebag and said passenger footrest, said motorcycle is further configured so that there is space between said saddlebag and said passenger footrest;
- wherein said stabilizer mounting fixture is further configured to specifically mount on only said at least one crash bar disposed between said saddlebag, and said passenger footrest;
- and wherein said stabilizer mounting fixture is further configured to fit into said space between said saddlebag and said passenger footrest.

5. The motorcycle wheel stabilizer device of claim 1, wherein said stabilizer mounting fixture is further configured to mount on a plurality of alternative motorcycle crash bar locations.

6. The motorcycle wheel stabilizer device of claim 5, wherein said arm is further configured to extend to a plurality of different arm lengths, thereby allowing said arm, to operate when said stabilizer mounting fixture is mounted on a plurality of alternative motorcycle crash bar locations.

7. The motorcycle wheel stabilizer device of claim 1, wherein each crash bar has both a lower crash bar portion and an upper crash bar portion; and
- wherein said stabilizer mounting fixture comprises a lower fixture portion with a plurality of indentations configured to accommodate said lower crash bar portion portion, and also comprises an upper fixture portion with a plurality of indentations configured to accommodate said upper crash bar portion.

8. The motorcycle wheel stabilizer device of claim 7, wherein said stabilizer mounting fixture lower fixture portion and said stabilizer mounting fixture upper fixture portion are each configured with a plurality of bolt holes;
- wherein said plurality of bolt holes are further disposed in said lower fixture portion and said upper fixture portion, and wherein said bolt holes are further disposed outside said plurality of indentations, so that when said lower fixture portion and said upper portion are bolted together, said stabilizer mounting fixture grips said crash bar tightly and is constrained from pivoting about said crash bar by at least one of the geometry of said motorcycle body or said crash bar.

9. The motorcycle wheel stabilizer device of claim 8, wherein said lower fixture portion of said stabilizer mounting fixture is further configured to form an arm holding clevis portion of a clevis fastener, and wherein said extendible actuator piston pivot component is disposed near the proximal end of said arm attaches to said arm holding clevis portion of a clevis fastener by way of an arm clevis pin.

10. The motorcycle wheel stabilizer device of claim 1, wherein said piston of said electrically operated linear actuator is mounted to said stabilizer arm using a piston clevis fastener.

11. The motorcycle wheel stabilizer device of claim 1, wherein said distal end of said arm is configured as a wheel clevis portion of a clevis fastener, and said stabilizer wheel is attached to said wheel clevis portion using a wheel clevis pin.

12. The motorcycle wheel stabilizer device of claim 1, further configuring two motorcycle wheel stabilizer devices, each disposed on opposite sides of said motorcycle, to stabilize said motorcycle.

13. The motorcycle wheel stabilizer device of claim 1, wherein said electrically operated linear actuator is further configured to receive electrical operating commands from a smartphone or other computer operated device.

14. The motorcycle wheel stabilizer of claim 1, wherein said motorcycle has a plane of substantial symmetry, and said stabilizer device is configured so that said arm, when fully extended, extends at an angle directed more than 10 degrees away from said plane of substantial symmetry.

15. The motorcycle wheel stabilizer of claim 1, wherein said stabilizer device is configured so that said arm, when fully extended, has an angle that is not within 10 degrees of perpendicular to the ground.

16. The motorcycle wheel stabilizer of claim 1, wherein said stabilizer wheel acts as the primary stabilizer wheel, and wherein said stabilizer arm further comprises an additional secondary stabilizer wheel disposed on a pivoting stabilizer wheel support near said distil end of said arm;

wherein said pivoting stabilizer wheel support further has a plurality of user adjustable positions allowing said secondary stabilizer wheel to act, relative to said primary stabilizer wheel, to bear some or all of a stabilizer load, thus facilitating slow speed movement of said motorcycle, or none of said stabilizer load.

17. The motorcycle wheel stabilizer of claim 1, wherein said pivoting stabilizer wheel support further comprises at least one of springs, elastic elements, or pneumatic elements configured to absorb at least some of the shock when said secondary stabilizer wheel support is in a user adjustable position enabling said secondary stabilizer wheel to bear at least some of said stabilizer load, and further facilitating slow speed movement of said motorcycle.

18. A motorcycle stabilizer wheel device configured to be installed in a non-stabilizer wheel equipped, two wheel OEM motorcycle comprising a two wheel motorcycle body, handlebars, at least one side mounted crash bar, and a motorcycle battery, without requiring irreversible structural modifications to said OEM motorcycle, said device comprising:

an electrically operated linear actuator with a motor side and an extendible actuator piston side, said electrically operated linear actuator configured to extend and retract an extendible actuator piston upon receiving power from said motorcycle battery;

a stabilizer mounting fixture configured to be mounted onto said at least one side mounted crash bar without requiring irreversible structural modifications to either said crash bar or said motorcycle body, wherein the sides of said stabilizer mounting fixture are curved wherein said stabilizer mounting fixture is further configured to mount on a plurality of alternative motorcycle crash bar locations;

a stabilizer arm with a proximal end and a distal end, said arm configured with a stabilizer mounting fixture pivot component and an extendible actuator piston pivot component disposed near said proximal end of said arm, and a stabilizer wheel disposed near said distal end of said arm;

wherein said arm is further configured to extend to a plurality of different arm lengths, thereby allowing said arm, to operate when said stabilizer mounting fixture is mounted on a plurality of alternative motorcycle crash bar locations;

wherein said electrically operated linear actuator is further configured to attach to said stabilizer mounting fixture at said motor side, and further configured to pivotally attach to said stabilizer arm at said extendible actuator piston pivot component;

wherein, when said extendable actuator piston is fully extended due to application of electrical current to said electrically operated linear actuator, said stabilizer arm extends outwards from said motorcycle body for a sufficient distance to stabilize said motorcycle body in an upright position;

and wherein, when said extendable actuator piston is fully retracted due to application of an opposite polarity electrical current to said electrically operated linear actuator, said stabilizer arm retracts towards said motorcycle body a sufficient distance for said motorcycle to operate normally on two standard motorcycle wheels without interference from said stabilizer arm.

19. The motorcycle wheel stabilizer of claim 18, wherein said stabilizer arm further comprises said stabilizer wheel acting as the primary stabilizer wheel, and an additional secondary stabilizer wheel disposed on a pivoting stabilizer wheel support near said distil end of said arm, wherein said pivoting stabilizer wheel support further has a plurality of user adjustable positions allowing said secondary stabilizer wheel to act, relative to said primary stabilizer wheel, to bear some or all of the stabilizer load, thus facilitating slow speed movement of said motorcycle, or none of said stabilizer load.

* * * * *